June 8, 1937.  A. H. HAUPT  2,082,833
METHOD AND APPARATUS FOR CUTTING CORDS OF PLASTIC
MATERIAL INTO PREDETERMINED LENGTHS
Filed Aug. 7, 1934   2 Sheets-Sheet 1

Albertus H. Haupt
by *[signature]*
Attorney

Albertus H. Haupt

Patented June 8, 1937

2,082,833

UNITED STATES PATENT OFFICE 2,082,833

METHOD AND APPARATUS FOR CUTTING CORDS OF PLASTIC MATERIAL INTO PREDETERMINED LENGTHS

Albertus Hendrik Haupt, Somerset West, Union of South Africa, assignor to Imperial Chemical Industries Limited, a corporation of Great Britain Application August 7, 1934, Serial No. 738,887
In Great Britain August 10, 1933

8 Claims. (Cl. 25—109)

This invention relates to an improved method and apparatus for cutting plastic material, especially explosives which are extruded or squirted into predetermined lengths.

The principal object of the present invention is to provide a method and apparatus whereby plastic material (especially gelatinous or plastic explosives) which is extruded from an extruding machine, may be cut by mechanically operated cutters into cords of a predetermined length irrespective of variations in the rate of extrusion. This is particularly useful in cutting cords of plastic explosive material of a fixed length from such material extruded from an ordinary extruding machine for the purpose of being made into cartridges.

According to the invention I extrude a length of plastic material which is slightly greater than the desired length and I shear the extruded length simultaneously in two places, at a predetermined distance apart from each other. The extruded length of plastic material is suitably sheared by means of knives which are caused to move in a closed path so that in returning to the cutting position they do not pass through the next length of plastic material while it is being extruded.

The invention is illustrated in the accompanying diagrammatic drawings in which

Figure 1:
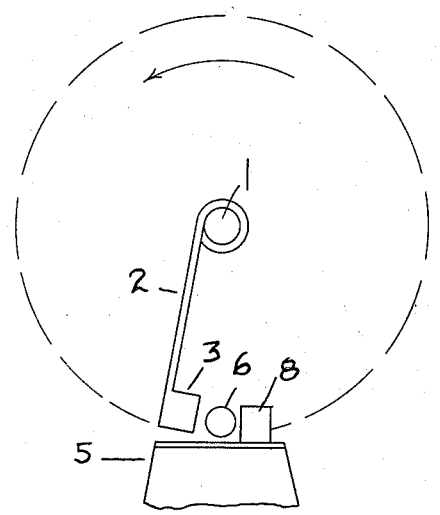
Figure 1 is an end elevation showing a cutter about to sever one end of a cord of plastic explosive.
Figure 2:
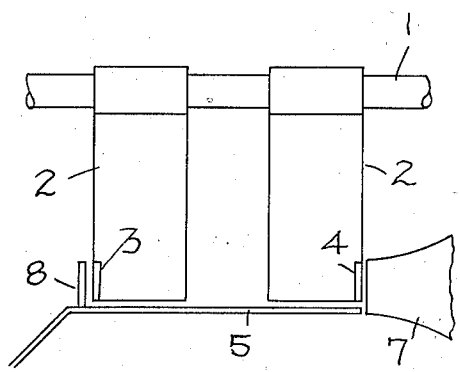
Figure 2 is a front elevation showing the cutters in the cutting position, but without a cord of explosive, the driven knives being shown as spaced from the cooperating knives in order to more clearly indicate in the drawings that separate elements are shown.

Referring to Figures 1 and 2 a shaft 1 is rotated at a suitable constant or an irregular pulsating or periodic speed by any suitable means. Fastened to the shaft at suitable distance apart are arms 2 having projecting blades or knives 3 and 4. A shelf or support 5 is provided for the explosive as it issues from the nozzle 7 of any suitable type of extruding machine. A knife or blade 8 is fixed in an upright position on the shelf 5 in such a position that the extruded material will pass close to it as it is continuing to be extruded by the extruding machine.

The extruding machine projects the cord of explosive 6 at a slightly irregular rate across the shelf 5. The shaft 1 is caused to rotate at a rate such that during one revolution the extruded explosive has been projected a short distance past the knife 8. As the shaft 1 revolves, the knives or cutter 3 and 4 carried on the arms 2 shear off the cord of explosive to the predetermined length, the passing of the knife 3 past the knife or blade 8 and the knife 4 past the face of the nozzle 7 effecting the severing or cutting action and automatically propelling the cut portion off the shelf 5. The end of the explosive cut off beyond the knife 8 falls into a suitable receptacle whence it is returned to the hopper of the extruding machine. It is often desirable to assist in freeing the cut portion from the cutter by placing a suitable stop plate to intercept and guide the said cut portion without hindering the cutter in its path.

The arms 2 are capable of being moved along the shaft 1 and fixed or adjusted at different distances apart so as to cut cords of different lengths, the blade or knife 8 being likewise capable of being moved and adjusted accordingly.

Instead of using the face of the nozzle 7 as the one cutting edge a knife or blade similar to 8 could be used at this end also but this is not usually necessary, the face of the nozzle being sufficient for this purpose.

Figure 3:
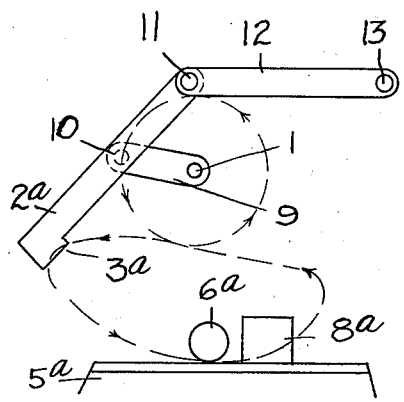
Figure 3 is an end elevation showing a form of cutter in which the cutting knives move with noncircular motion.

Referring to Figure 3, the shaft 1 is rotated at a constant or variable speed and carries a crank 9 which carries a crankpin 10.

The crankpin passes through the arm 2a and is free to rotate therein. The arm 2a carries the knife 3a. The arm 2a is extended on the side of the crank pin away from the knife 3a for a suitable distance and is fastened to a link 12 by a pin 11. The link 12 is free to oscillate about a pin 13 which is fixed in relation to the shaft 1 and the shelf 5a.

By these means the extremity of the arm 2a carrying the knife 3a is caused to follow an elliptical path, the axis of the pin 11 moving in the arc of a circle having the axis of the pin 13 as its centre.

Figure 3A:
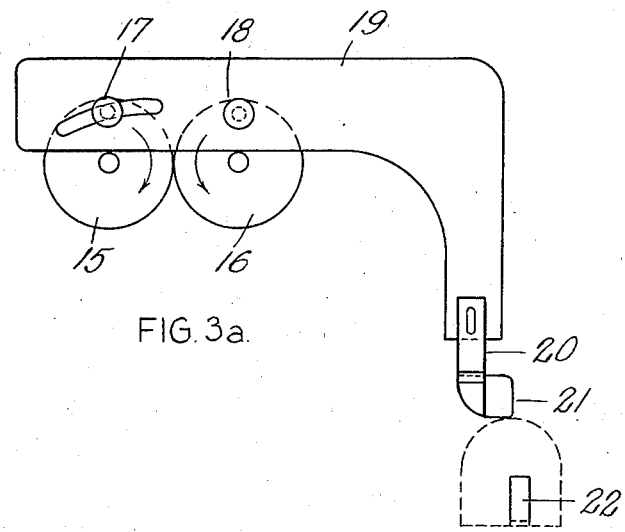
Figure 3a is an end elevation showing a cutter in which the cutting knives move in an alternative form of noncircular motion.
Figure 4:
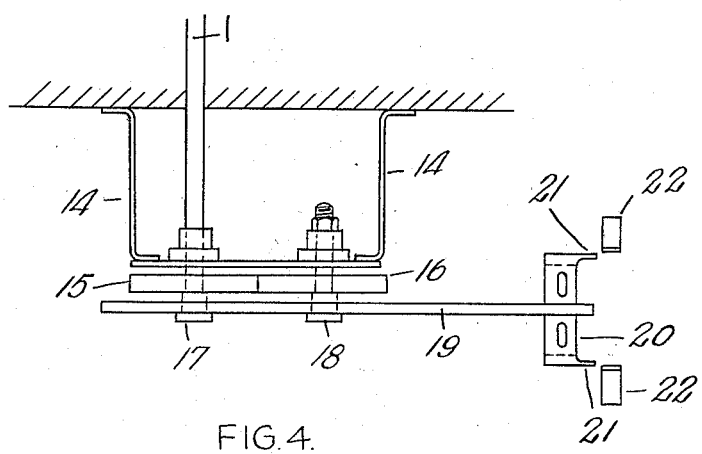
Figure 4 is a plan view of the device illustrated in Figure 3a, the driven knives being shown as spaced from the cooperating knives in order to more clearly indicate in the drawings that separate elements are shown.

Referring to Figures 3a and 4, a driving shaft 1 passes through a supporting bracket 14 and drives a gear wheel 15 which in turn drives an equal gear wheel 16 also mounted on the bracket. Identical crank pins 17 and 18 are mounted on the two gear wheels so that they describe equal circles in opposite directions, the wheels being so geared together that the motion of each crank pin is a mirror image of the motion of the other. A link 19 carries on its forward arm an adjustable knife holder 20 on which the cutting knives 21 are mounted in such a manner that they may be adjusted for height and separation. The link is pivoted on the crank pin 18 and crank pin 17 engages in a curved slot in the rearward extension of the link. The form of the slot is designed so that the simultaneous rotation of the two gear wheels constrains the cutting knives to follow a path of the type shown by the dotted line in Figure 3a, in which a straight forward cut past the knife stops 22 is followed by a lift and return motion. The motion of the cutting knives may be accelerated at any desired position on their path, for example during the forward cutting motion, by using elliptical gear wheels or otherwise in known manner. The actual path traversed by the cutting knives may be modified by making suitable alterations to the form of the slot in the rearward extension of the link.

By a suitable combination of levers, cranks and gears the cutting knives can, in a manner well-known to those skilled in the art, be made to traverse any one of a numerous variety of figures and I do not limit myself to any one particular form.

As many apparently widely different embodiments of this invention may be made without departing from the spirit and scope thereof, it is to be understood that I do not limit myself to the specific embodiments thereof except as defined in the appended claims.

I claim:—

1. A method of cutting extruded plastic material, that is of continuous body fully crosswise thereof, into pieces of predetermined length, irrespective of variations in the rate of extrusion, which comprises extruding a length of the plastic material slightly greater than the desired length and shearing the extruded material completely across the body at two points by means of knives, and moving said knives, in said cutting operation, in a continuous, unreversed, closed path, which intersects the path of travel of the extruded material on the cutting stroke and which does not intersect said path of travel of the material on its return stroke so that the material is not cut on the return stroke, nor is the forward travel of the material to place a new portion thereof in cutting position interrupted.

2. Apparatus suitable for cutting extruded plastic material, that is of continuous body fully crosswise thereof, into pieces of predetermined length, irrespective of variations in the rate of extrusion, which comprises two knives separated from one another by the desired distance, and arranged for cutting the plastic completely across the same upon actuation of the knives, means for mounting said knives in position for simultaneous cutting action and for travel over a continuous, unreversed closed path located in its non-cutting stretch in non-intersecting relation to the body to be cut, and means for driving the knives over such path, whereby the knives are arranged to so cut the extruded material simultaneously in two places and to follow a continuous, unreversed, closed path so that after shearing the extruded material they return to the cutting position without crossing the path of the next length of material being extruded, thus avoiding interruption of the feeding of such length into cutting position.

3. Apparatus as claimed in claim 2 in which the knives are provided with means whereby the distance separating them may be varied.

4. In an apparatus suitable for cutting extruded plastic material, that is of continuous body fully crosswise thereof, into pieces of predetermined length, irrespective of variations in the rate of extrusion, in combination: a cutting table, two knives separated from one another by the desired distance, means for mounting said knives above said table in position for simultaneous cutting action completely across the plastic and for travel over a continuous, unreversed closed path located in its non-cutting return stretch in non-intersecting relation to the body to be cut, and means for driving the knives over such path, whereby the knives are arranged for movement above said table for forward cutting movement above and crosswise the same to cut the extruded material simultaneously in two places and for return to initial position, over a continuous, unreversed, closed path so that after shearing the extruded material they return to the cutting position without crossing the path of the next length of material being extruded, thus avoiding interruption of the feeding of such length into cutting position, said means for mounting and driving said knives including a pair of spaced arms carrying said knives which project forwardly therefrom, said arms being of substantial width in the direction of the length of said material as it lies upon said table and closing the gap between said knives in at least substantial part, the ends of said arms extending into close proximity to the surface of the cutting table upon the cutting travel of the knives, whereby said arms serve to propel the cut plastic from the table upon completion of the cutting thereof.

5. An apparatus as claimed in claim 4 wherein there are means for shearing cooperation with said knives which comprise a blade fixed with respect to said table, and an extruding nozzle, respectively operatively related to the knives.

6. Apparatus suitable for cutting extruded plastic material, that is of continuous body fully crosswise thereof, into pieces of predetermined length, irrespective of variations in the rate of extrusion, which comprises two knives separated from one another by the desired distance, and arranged for cutting the plastic completely across the same upon actuation of the knives, and means for actuating the knives to so cut the extruded material simultaneously in two places and to follow a continuous, unreversed, closed path so that after shearing the extruded material they return to the cutting position without crossing the path of the next length of material being extruded, thus avoiding interruption of the feeding of such length into cutting position, such actuating means including provisions for imparting to the knives a speed over the cutting path which is greater than the speed over the return path.

7. In an apparatus suitable for cutting extruded plastic material, that is of continuous body fully crosswise thereof, into pieces of predetermined length, irrespective of variations in the rate of extrusion, in combination: a cutting table, two knives separated from one another by the desired distance, and arranged for cutting the plastic completely across the same upon actuation of the knives and mounted above said table for forward cutting movement above and crosswise the same to cut the extruded material simultaneously in two places and for return to initial position, over a continuous, unreversed, closed path so that after shearing the extruded material they return to the cutting position without crossing the path of the next length of material being extruded, thus avoiding interruption of the feeding of such length into cutting position, and means for so mounting and actuating said knives including a pair of spaced arms carrying said knives projecting forwardly therefrom, and of substantial width in the direction of the length of said material as it lies upon said table and closing the gap between said knives in at least substantial part, the ends of said arms extending into close proximity to the surface of the cutting table upon the cutting travel of the knives, whereby said arms serve to propel the cut plastic from the table upon completion of the cutting thereof, and means for actuating said arms to move said arms and knives along said closed path, such actuating means including provisions for imparting to the knives a speed over the cutting path which is greater than the speed over the return path.

8. An apparatus as claimed in claim 2 wherein the knives are of the shearing type and fixed cooperating shearing members are provided therefor.

ALBERTUS HENDRIK HAUPT.